United States Patent [19]

Trenkler

[11] Patent Number: 4,611,849
[45] Date of Patent: Sep. 16, 1986

[54] CONVERTIBLE TOP WITH INTERCHANGEABLE FLEXIBLE AND RIGID REAR WINDOWS FOR A PASSENGER MOTOR VEHICLE

[75] Inventor: Werner Trenkler, Asperg, Fed. Rep. of Germany

[73] Assignee: Dr.Ing. h.c.F. Porsche AG, Fed. Rep. of Germany

[21] Appl. No.: 587,626

[22] Filed: Mar. 8, 1984

[30] Foreign Application Priority Data

Mar. 26, 1983 [DE] Fed. Rep. of Germany ....... 3311144

[51] Int. Cl.⁴ .............................. B60J 1/18; B60J 7/12
[52] U.S. Cl. .................................... 296/201; 296/107; 296/121; 296/145; 49/465
[58] Field of Search ................................ 296/107–119, 296/121, 145, 201; 49/463, 465; 160/DIG. 2, DIG. 12

[56] References Cited

U.S. PATENT DOCUMENTS

| | | | |
|---|---|---|---|
| 1,355,558 | 10/1920 | Loud | 296/145 |
| 2,495,022 | 1/1950 | Robbins | 296/145 |
| 2,768,025 | 10/1956 | Spear, Jr. et al. | 296/117 |
| 2,772,114 | 11/1956 | Hennessy | 296/107 |
| 2,798,763 | 7/1957 | Dujic | 296/145 |
| 3,096,117 | 7/1963 | Hallenbeck | 296/107 |
| 3,333,362 | 8/1967 | Kostin et al. | 296/145 |
| 3,476,437 | 11/1969 | Schroeder et al. | 296/107 |
| 3,957,068 | 5/1976 | Cox | 160/392 |
| 4,220,298 | 9/1980 | Willis | 160/DIG. 18 |
| 4,415,196 | 11/1983 | Baum et al. | 296/201 |
| 4,491,361 | 1/1985 | Kolb | 296/107 |

Primary Examiner—Robert B. Reeves
Assistant Examiner—Dennis H. Pedder
Attorney, Agent, or Firm—Craig & Burns

[57] ABSTRACT

A convertible top for a passenger motor vehicle with a top cover includes a rear wall window formed by a flexible windowpane. In order to provide a rear wall window that responds to the requirements during summer and winter operation, the flexible windowpane is constructed to be removable and interchangeable with a fixed-glass windowpane. The fixed-glass pane is provided at an edge facing the body with plug-in elements which cooperate with receiving and mounting devices arranged on the side of the body. Additionally, the fixed-glass pane is retained at the body by means of at least one disengageable locking mechanism and is connected to adjacent body parts.

27 Claims, 8 Drawing Figures

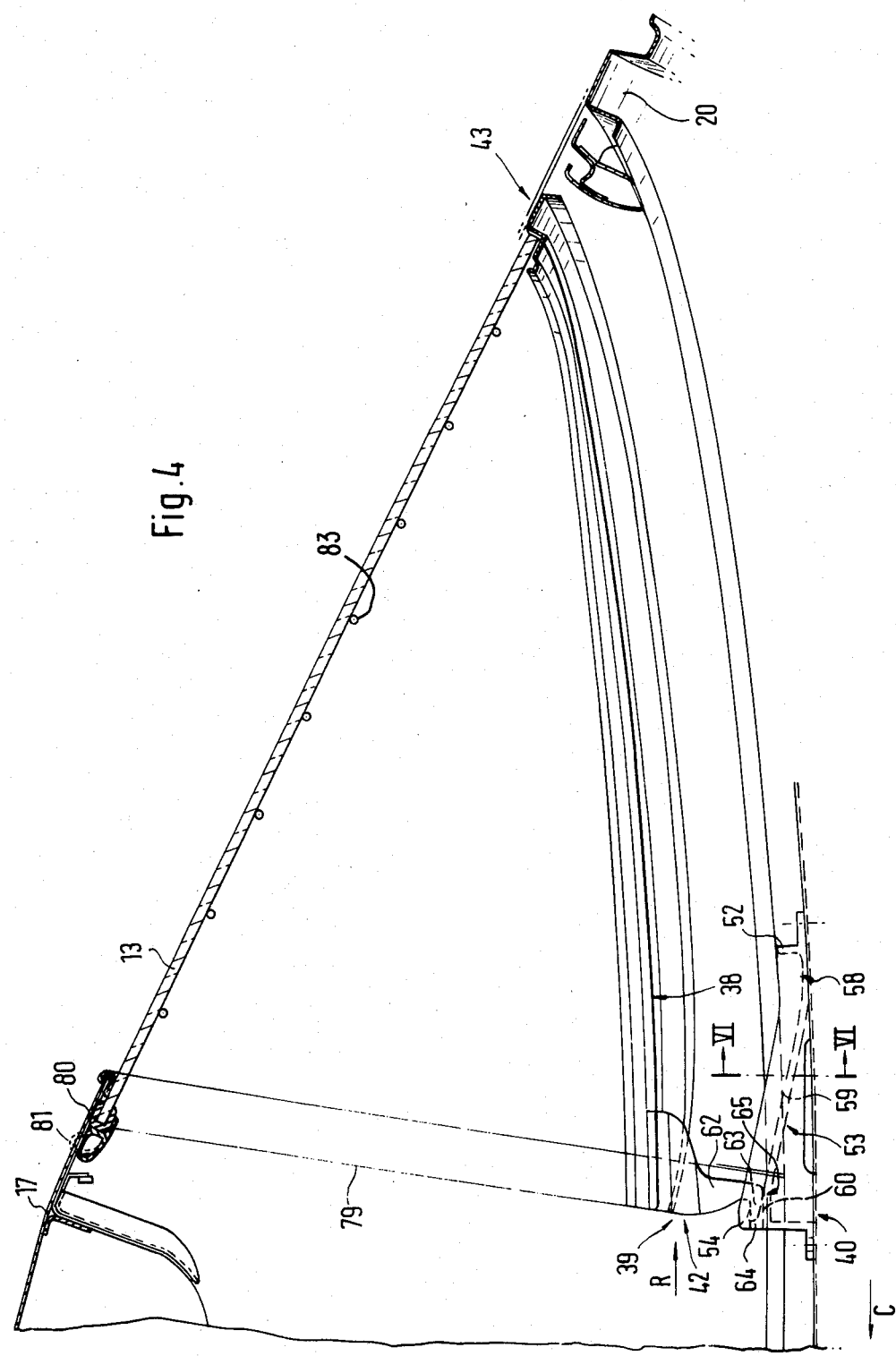

CONVERTIBLE TOP WITH INTERCHANGEABLE FLEXIBLE AND RIGID REAR WINDOWS FOR A PASSENGER MOTOR VEHICLE

The present invention relates to a convertible top for a passenger motor vehicle with a top cover which includes a rear window formed by a flexible windowpane.

In a prior art convertible top of the aforementioned type (German Offenlegungsschrift No. 31 27 524), the rear window is formed by a flexible windowpane (polyglass pane). Such a windowpane completely fulfills the requirements made thereof during summer operation. However, it has been found that during winter operation, the removal of a coating layer (snow, ice) leads to damaging of the surface of the windowpane (scratches, grooves), as a result of which free visibility is impaired.

Furthermore, a top arrangement is known (German Auslegeschrift No. 11 79 125), in which the rear window is formed by a fixed-glass windowpane provided with a mounting frame. The fixed-glass windowpane is movable from a use position into a recessed or lowered rest position by means of a pivot mechanism. This prior art arrangement entails the disadvantage that a costly pivot mechanism composed of several structural parts is required along both vehicle longitudinal sides for the pivoting of the heavy fixed-glass pane. Added thereto is the fact that the design of a vehicle within the area of the top is limited by this construction.

It is the aim of the present invention to provide a convertible top whose rear wall window corresponds to the requirements for summer and winter operation.

The underlying problems are solved according to the present invention in that the flexible windowpane is constructed so as to be removable and interchangeable with a fixed-glass windowpane whereby the fixed-glass windowpane is provided with plug-in elements at an edge facing the body which cooperate with receiving and mounting means arranged on the side of the body and in that therebeyond the fixed-glass windowpane is retained at the body by means of at least one disengageable locking mechanism, and in that the fixed-glass windowpane is connected to adjacent body parts.

The advantages principally achieved with the present invention reside in that the rear wall window is interchangeable depending on the time of the year and weather conditions. The zipper connections of the flexible windowpane and the plug-in elements as well as the locking mechanism of the fixed-glass windowpane thereby assure that the interchange proceeds rapidly and in a simple manner. The exchange is possible without problems and without the need of skilled personnel and special tools. The connections of the windowpane with the body are so constructed that, on the one hand, they are adapted to be readily integrated into the body and, on the other hand, they fulfill the existing sealing requirements. The receiving and mounting means and the plug-in elements as well as the locking mechanism are parts which can be manufactured in a simple manner and which can be readily attached at the windowpane and at the body. The heating wires provided on the fixed-glass windowpane quickly bring about a clear field of vision in case the fixed glass windowpane should become fogged-up or provided with a coating layer (ice or snow).

These and other objects, features and advantages of the present invention will become more apparent from the following description when taken in connection with the accompanying drawing which shows, for purposes of illustration only, one embodiment in accordance with the present invention, and wherein:

FIG. 4 is a side elevational view, partly in cross section, illustrating the installed fixed-glass windowpane in accordance with the present invention;

Figure 1:
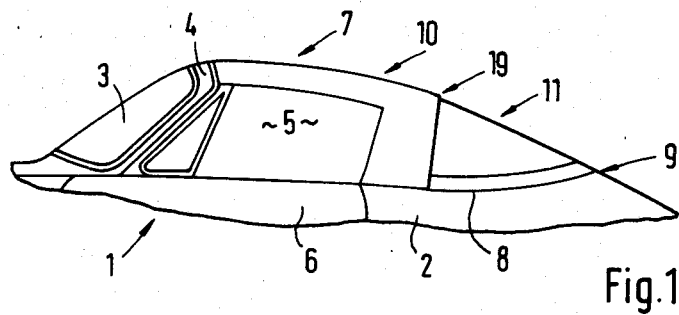
FIG. 1 is a partial side elevational view of a passenger motor vehicle with a convertible top in accordance with the present invention.

Referring now to the drawing wherein like reference numerals are used throughout the various views to designate like parts, the passenger motor vehicle generally designated by reference numeral 1 includes within the area illustrated in FIG. 1, a fixed body 2 with a windshield 3 which is retained in a windshield frame 4. A passenger space 5 is accessible by a door 6 and is covered by a convertible top generally designated by reference numeral 7 which extends above a belt line 8, and more particularly from the windshield frame 4 to a rear passenger space boundary 9.

The convertible top 7 includes essentially a top cover 10 and a top frame (not shown) of known construction which carries the top cover 10 and is pivotally connected at the body 2. One possible construction of the top frame is described, for example, in the German Offenlegungsschrift No. 31 27 524.

The convertible top 7 includes a rear window 11 which can be formed by a flexible windowpane 12 (FIGS. 2 and 3) or by a fixed-glass windowpane 13 (FIGS. 4 and 7) which are selectively interchangeable with respect to one another.

Figure 2:
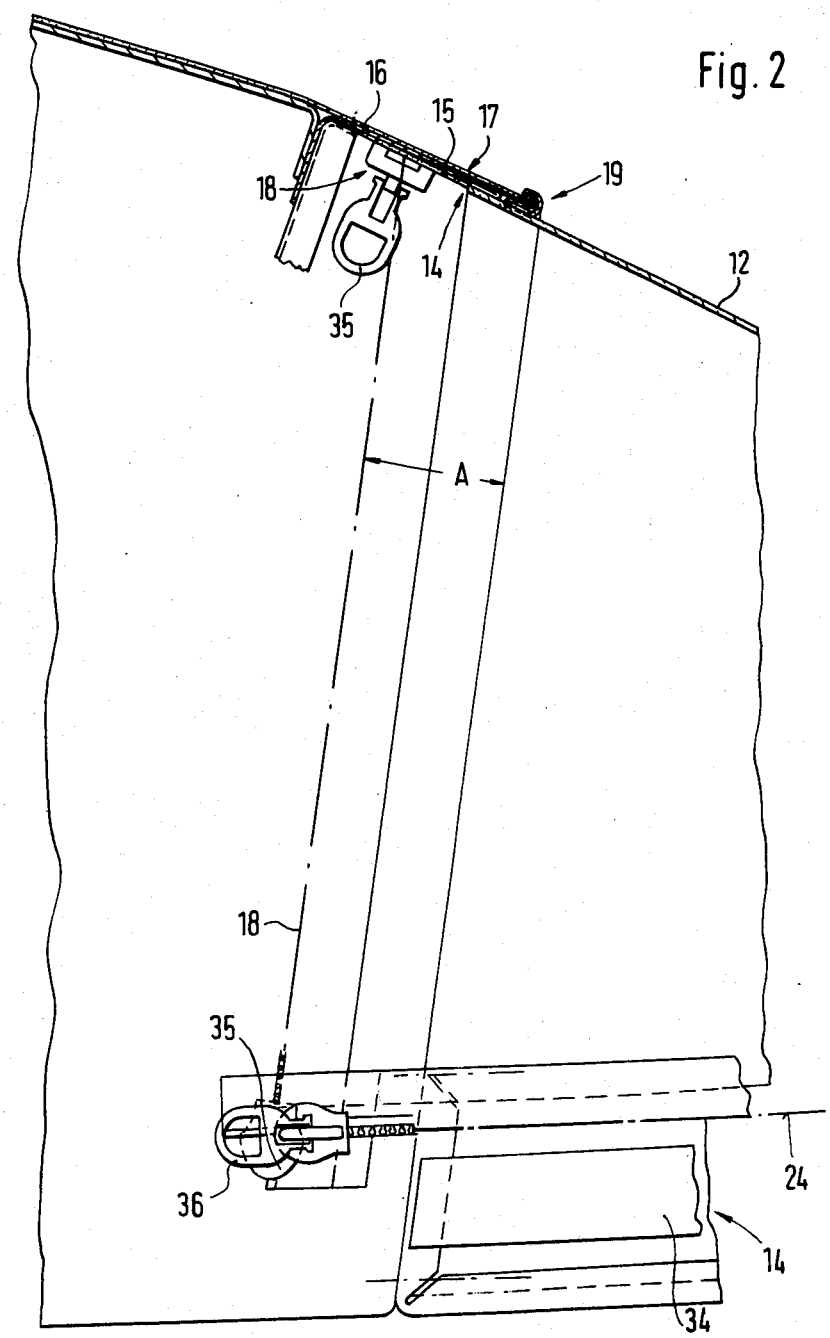
FIG. 2 is a partial side elevational view of FIG. 1, on an enlarged scale and partly in cross section.

The flexible windowpane 12 (polyglass windowpane) is surrounded along the circumference by an edge strip generally designated by reference numeral 14 made of top material and is constructed so as to be removable. For this purpose, a forward section 15 (FIG. 2) of the edge strip 14 is disengageably connected with an inner layer 16 of a forward top cover section 17 by way of a first zipper 18. The top cover section 17 extends from the windshield frame 4 to an area 19 (FIG. 1) lying to the rear of the door 6 and overlaps the flexible windowpane 12 and the forward section 15 by the distance A (FIG. 2). After the opening of the zipper connection 18 spanning the passenger space 5 bow-shaped, the flexible windowpane 12 can be lowered prior to the folding back of the convertible top 7, as a result of which deformations at the flexible windowpane 12 leading to damages are avoided.

Figure 3:
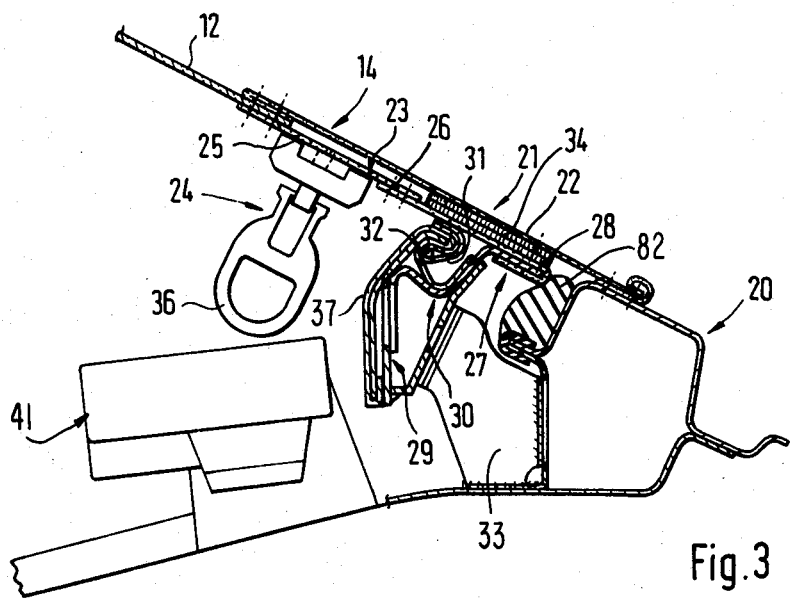
FIG. 3 is a center longitudinal cross-section view through the rear area of the flexible windowpane and an adjoining rear frame in accordance with the present invention.

The section 21 of the edge strip 14 extending adjacent a rear frame 20 is composed of an outer layer 22 and an inner layer 23 (FIG. 3). The inner layer 23 is subdivided by means of a second zipper connection 24 into a section 25 on the side of the windowpane and into a section 26 retained on the side of the body. The zipper 24 extends along the rear frame 20. The free end 27 of the section 26 is drawn about a flange 28 of a curved tensioning member generally designated by reference numeral 29 and is secured thereon by bonding, gluing or the like. The flange 28 extends in prolongation of the windowpane contour. A U-shaped profiled channel 30 of the curved tensioning member 29 is provided at the inner side of the flange 28, in which a loop-shaped gusset or fold 31 of the section 26 is retained in position. For that purpose, a tensioning cable 32 is threaded into the gusset or fold 31 which is adjustable by means of a tensioning device of known construction (not shown) arranged at the forward end of the curved tensioning member 29, whereby the retaining section 26 is always secured in proper position. The curved tensioning member 29 is arranged on the side of the rear frame 20 facing the passenger space 5 and is connected with locally provided retaining lugs 33 of the rear frame 20 by detachable fastening elements.

The outer layer 22 of the section 21 of the edge strip 14 extends from the edge of the windowpane 12 to the rear frame 20 (FIG. 3) and is detachably connected within the area of the curved tensioning member 29 with the section 26 of the inner layer 23 by way of a disengageable adhesive connection 34 of conventional type. The entry of water within the area of the zipper 24 is prevented by the outer layer 22 and the adhesive connection 34. The disengageable adhesive connection 34 consists of an adhesive band provided on the inside of the outer layer which cooperates with an adhesive band provided at the outside of the section 26 of the type known as "VELCRO" connections.

With closed zipper connections 18 and 24, their sliders 35 and 36 are located at oppositely disposed vehicle longitudinal sides. After the opening of the zipper connections 18 and 24 from within the passenger space 5 and after the separation of the adhesive connection 34 from the vehicle outside, the flexible windowpane 12 can be removed. The sliders 35 and 36 remain at the removed windowpane 12. The circumferential arrangement of the zippers 18 and 24 at the flexible windowpane 12 also enables a simple replacement of a damaged flexible windowpane 12.

In lieu of zippers 18 and 24, snap buttons or the like may also be provided locally at the edge strip 14 of the elastic windowpane 12 so that an easy disengagement of the flexible windowpane 12 is possible.

Figure 7:
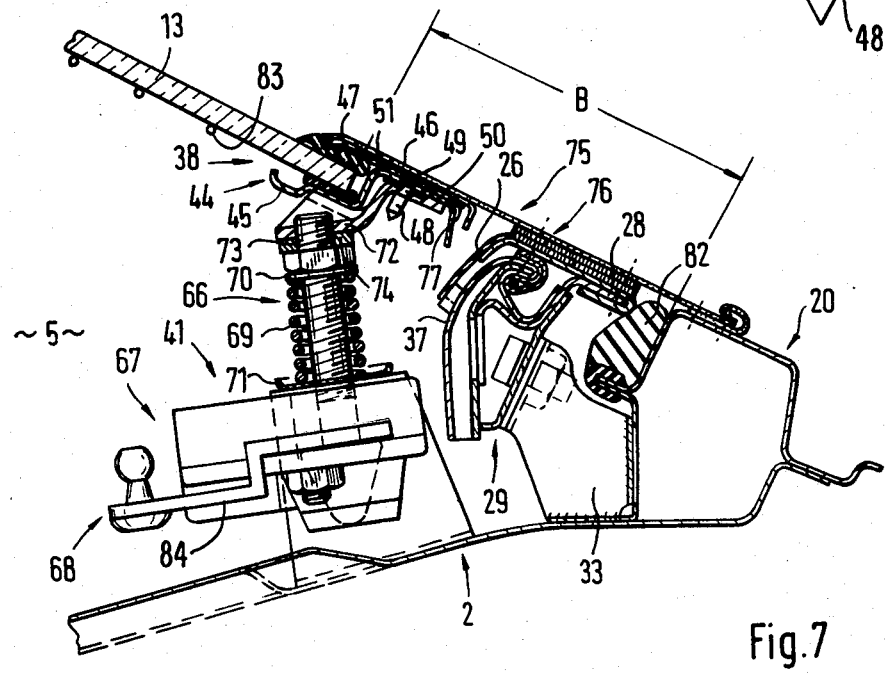
FIG. 7 is a center longitudinal cross-sectional view through the rear edge area of the fixed-glass windowpane and of the adjoining rear frame in accordance with the present invention.

With a removed flexible windowpane 12, the section 26 abuts at a vertically extending wall section 37 of the curved tensioning member 29 (FIG. 7). The wall section 37 forms a covering for the rear frame 20 on the side of the passenger space 5.

Figure 5:
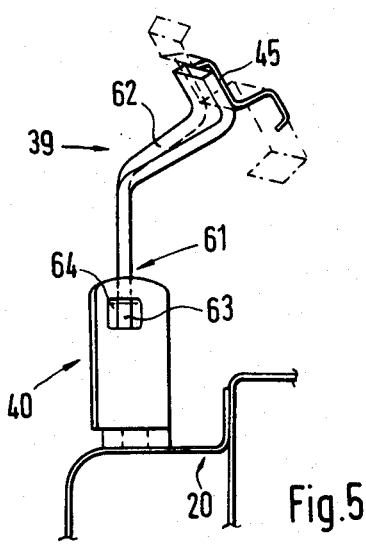
FIG. 5 is an elevational view in the direction of arrow R of FIG. 4.
Figure 6:
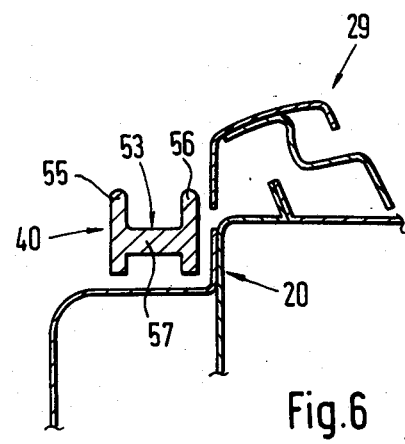
FIG. 6 is a cross-sectional view, taken along line VI—VI of FIG. 4.
Figure 8:
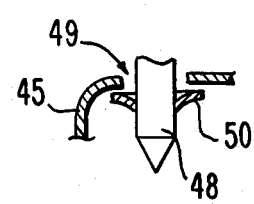
FIG. 8 shows the locking nut structure of FIG. 7 in enlarged cross-section.

For the winter operation, the flexible windowpane 12 can be interchanged with the fixed-glass windowpane 13. The fixed-glass pane 13 is preferably provided with electric heating wires 83, as a result of which a clear field of vision will be created in shortest possible time in case the fixed-glass pane 13 becomes fogged up or provided with a coating layer (ice or snow). The fixed-glass windowpane 13 is provided at its lower edge 38 facing the body 2, on the one hand, with plug-in elements 39 (FIGS. 4 and 5) which cooperate with receiving and mounting devices generally designated by reference numeral 40 (FIGS. 4 and 6) arranged on the side of the body and, on the other hand, the fixed-glass pane 13 is retained at the body 2 by means of at least one disengageable locking mechanism 41 (FIG. 7). In the illustrated embodiment, the fixing of the fixed-glass windowpane 13 takes place by means of a three-point support. For this purpose, one plug-in element 39 each is provided at the two forward, outwardly located end areas 42 of the fixed-glass pane 13 and one receiving and mounting device 40 each at the rear frame 20 whereas the locking mechanism 41 is arranged in the rear, transversely extending section 43 of the fixed-glass pane 13 and body 2.

However, the possibility also exists to provide several locking mechanisms 41 for the retention and mounting of the fixed-glass pane 13.

The lower edge 38 of the fixed-glass pane 13 is provided continuously with a mounting frame 44, on which the plug-in elements 39 and parts of the locking mechanism 41 are secured by welding, bonding, gluing or the like. The mounting frame 44 is formed by a profile part 45 (FIG. 7) mounted along the inside of the fixed-glass windowpane 13 and by a cover rail 46 arranged on the outside thereof, whereby a sealing body 47 of rubber or plastic material is clampingly retained between the cover rail 46 and the outside of the fixed-glass pane 13.

The profile part 45 adhesively secured to the fixed-glass pane 13 and the cover rail 46 are fixedly connected with each other outside of the fixed-glass pane 13 along flanges extending in the same direction. For that purpose, downwardly projecting bolts 48 are locally provided at the cover rail 46, which project through openings 49 of the profile part 45 disposed therebelow. A spring disk 50 is clipped over each bolt 48, which is supported at the inside 51 of the profile part 45.

The receiving and mounting devices 40 arranged along oppositely disposed vehicle longitudinal sides are locally connected with the body 2 by means of detachable fastening elements. Each receiving and mounting device 40 includes, as viewed in the driving direction, a transversely extending rear abutment or stop 52 (FIG. 4), a guide ramp 53 adjoining the abutment 52 as well as a forward retention section 54. The receiving and mounting devices 40 are made of a suitable known plastic material which possess good sliding properties. The guide ramp 53 extending between abutment or stop 52 and retaining section 54 is constructed U-shaped in cross section (FIG. 6) whereby its legs 55 and 56 serve as lateral guidance for the plug-in elements 39. The web 57 extending between the legs 55 and 56 extends approximately horizontally in a first area 58, adjacent the stop 52. An inclined plane 59 adjoins the area 58 which, as viewed in the driving direction C, rises and passes over into an upper, horizontally extending section 60 of the retaining section 54 (FIG. 4).

The two receiving and mounting devices 40 are each arranged inside of the curved tensioning member 29—as viewed in the vehicle transverse direction. For that reason, the plug-in elements 39 are correspondingly angularly bent at their sections 61 (FIG. 5) cooperating with the receiving and mounting devices 40. Each plug-in element 39 is formed by a detent hook 62 whereby an offset 63 arranged in the lower area of the detent hook 62 engages with its free end into an opening 64 of the retaining section 54. The opening 64 has a rectangular cross section and—as viewed in the transverse direction—is dimensioned larger than the width of the detent hook 62 so that installation tolerances can be absorbed in the vehicle transverse direction.

The surface 65 (FIG. 4) of the offset 63 which cooperates with the web 57, is constructed spherically shaped in order to keep as low as possible the friction forces during the insertion of the detent hooks 62 in the receiving and mounting devices 40.

The locking mechanism 41 (FIG. 7) is composed of a locking pin 66 secured at the mounting frame 44 and of a lower lock part 67 mounted at the body, whereby the locking pin 66 is retained in its locked position by a locking catch 84 of the lower lock part 67. For unlocking the locking mechanism 41, a lever 68 of the lower lock part 67 is actuated from within the passenger space 5, which pivots the locking catch 84 and thus releases the locking pin 66. An ejection spring 69 arranged at the locking pin 66 assures that the fixed-glass windowpane 13 together with the locking pin 66 is displaced upwardly and thus comes out of engagement with the lower lock part. The ejection spring 69 is arranged coaxially at the cylindrical section of the locking pin 66 and is supported in its compressed condition at an upper spring disk and at a lower spring disk 71. The locking pin 66 is secured at the mounting frame 44 by means of a retaining element 72, whereby the retaining element 72 and the locking pin 66 cooperate by way of a thread 73. For increasing the carrying thread, a reinforcing plate 74 is provided at the retaining member 72.

Since the lower edge 38 of the fixed-glass pane 13 extends circumferentially with a spacing B (FIG. 7) with respect to the adjoining rear frame 20, an edge strip 76 of top material for covering the gap 75 is provided, which is secured at the mounting frame 44 and extends up to the rear frame 20. The fastening of the edge strip 76 at the mounting frame 44 takes place by clamping-in a folded-back section 77 between the profile part 45 and the cover rail 46. The edge strip 76 is detachably connected with the section 26 within the area of the curved tensioning member 29 by way of a separable adhesive connection 78, such as a "VELCRO" connection.

A sealing body 80 is mounted over the forward edge 79 (FIG. 4) of the fixed-glass windowpane 13 spanning the passenger space bow-shaped, whose hose-shaped sealing area 81 abuts under prestress at the top cover section 17 disposed thereabove.

A sealing body 82 (FIG. 7) is arranged on the side of the rear frame 20 facing the passenger space 5, which closes the gap between the rear frame 20 and the flange 28 of the curved tensioning member 29.

The installation of the fixed-glass windowpane 13 takes place as follows: After the removal of the flexible windowpane 12, the detent hooks 62 of the fixed-glass pane 13 are inserted into the corresponding receiving and mounting devices 40 and the rear end of the fixed-glass pane 13 is lifted to such an extent that the locking pin 66 lies above the rear frame 20. The fixed-glass pane 13 is then slid forwardly, respectively, upwardly by way of the guide ramp 53 until the offsets 63 of the detent hooks 62 engage in retaining sections 54 of the receiving and mounting devices 40. Since the rear end of the fixed-glass pane 13 is lifted, the forward edge 79 can be easily inserted underneath the edge section of the forward top cover section 17. Subsequently, the rear end together with the locking pin 66 is lowered until the locking pin 66 engages into the lock catch of the lower lock part 67. As a result of this assembly operation which determines the end position of the fixed-glass pane 13, the sealing member 80 presses with prestress against the cover section 17 disposed thereabove.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A convertible top for a passenger motor vehicle having a body, comprising a top cover means including a rear wall window formed by a flexible windowpane means, and flexible windowpane means being constructed so as to be removable and interchangeable for a fixed-glass windowpane means, the fixed-glass windowpane means being provided at an edge facing the vehicle body with plural locking hook plug-in means, one of the plural locking hook means being located relative to a vehicle longitudinal axis at one lateral side of the fixed-glass windowpane means and another of the plural locking hook means located at an opposite side of the fixed-glass windowpane means, which plural locking hook means cooperate with plural hook receiving and mounting means separately arranged on each side of the body to retain the sides of the fixed-glass windowpane to the sides of the body, disengageable locking means for retaining the fixed-glass windowpane means at the body, and the fixed-glass windowpane means being connected with adjacent body parts.

2. A convertible top according to claim 1, wherein said adjacent body parts include a top cover section and a rear frame means.

3. A convertible top according to claim 1, comprising a first zipper means for detachably connecting the flexible windowpane means with an inner layer of a forward top cover section spanning the passenger space arcuately-shaped, and a second zipper means cooperating with an edge strip of the flexible windowpane means, said edge strip extending along a rear frame means of the body.

4. A convertible top according to claim 3, wherein the edge strip includes an outer layer and an inner layer, the second zipper means subdividing the inner layer into a section on the side of the windowpane means and a section retained on the side of the body.

5. A convertible top according to claim 4, further comprising curved tensioning means provided with a channel, and a tensioning wire arranged in a loop-shaped gusset of the inner layer section on the side of the body for securing said last-mentioned section in the channel of said tensioning means.

6. A convertible top according to claim 5, further comprising disengageable adhesive connecting means within the area of the tensioning means, said adhesive connecting means being provided between said last-mentioned section on the side of the body and the outer layer of the edge strip.

7. A convertible top according to claim 6, further comprising a mounting frame means for the lower edge of the fixed-glass windowpane means, the plug-in means and parts of the locking means being retained on said mounting frame means.

8. A convertible top according to claim 7, wherein said mounting frame means includes a profile part provided on the inside of the fixed-glass windowpane means and a cover rail arranged on the outside thereof, and sealing means clampingly retained between the outside of the fixed-glass windowpane means and the cover rail.

9. A convertible top according to claim 8, wherein the profile part and the cover rail are securely connected with each other outside of the fixed-glass windowpane means, bolts locally arranged at said cover rail projecting through corresponding openings of the profile part disposed therebelow, and said profile part and cover rail being clamped together by spring disk means clipped onto the bolts.

10. A convertible top according to claim 8, wherein an edge strip means is provided at the mounting frame means which edge strip means rests on the rear frame means and is detachably connected with the inner layer top section on the side of the body by way of a disengageable adhesive connecting means.

11. A convertible top according to claim 1, wherein each plug-in means is formed by a detent hook which engages in a retaining section of the receiving and mounting means.

12. A convertible top according to claim 11, wherein each receiving and mounting means includes a transversely extending abutment and a guide ramp adjoining the abutment, said guide ramp being delimited by a retaining section.

13. A convertible top according to claim 12, wherein the guide ramp is constructed U-shaped in cross section, the legs of said U-shaped guide ramp serving as lateral guidance for the detent hooks.

14. A convertible top according to claim 13, wherein the guide ramp includes a first horizontal section arranged adjacent said abutment and an inclined plane adjoining the section the inclined plane rising as viewed in the driving direction.

15. A convertible top according to claim 14, wherein each locking means includes a locking pin secured at the mounting frame means by way of a holding means and a lower lock part arranged at the body, the locking pin cooperating with a locking catch of the lower lock part.

16. A convertible top according to claim 15, further comprising a sealing member placed on the forward edge of the fixed-glass windowpane means spanning the passenger space bow-shaped, the sealing member abutting under prestress at the top cover section disposed thereabove.

17. A convertible top according to claim 16, wherein the fixed-glass windowpane means includes electric heating wires.

18. A convertible top according to claim 1, further comprising a mounting frame means for the lower edge of the fixed-glass windowpane means, the plug-in means and parts of the locking means being retained on said mounting frame means.

19. A convertible top according to claim 18, wherein said mounting frame means includes a profile part provided on the inside of the fixed-glass windowpane means and a cover rail arranged on the outside thereof, and sealing means clampingly retained between the outside of the fixed-glass windowpane means and the cover rail.

20. A convertible top according to claim 19, wherein the profile part and the cover rail are securely connected with each other outside of the fixed-glass windowpane means, bolts locally arranged at said cover rail projecting through corresponding openings of the profile part disposed therebelow, and said profile part and cover rail being clamped together by a spring disk means clipped onto the bolts.

21. A convertible top according to claim 19, wherein an edge strip means is provided at the mounting frame means which edge strip means rests on a rear frame means and is detachably connected with an inner layer top section on the side of the body by way of a disengageable adhesive connecting means.

22. A convertible top according to claim 1, wherein each receiving and mounting means includes a transversely extending abutment and a guide ramp adjoining the abutment, said guide ramp being delimited by a retaining section.

23. A convertible top according to claim 22, wherein the guide ramp is constructed U-shaped in cross section, the legs of said U-shaped guide ramp serving as lateral guidance for detent hooks of the plug-in means.

24. A convertible top according to claim 22, wherein the guide ramp includes a first horizontal section arranged adjacent said abutment and an inclined plane adjoining the section, the inclined plane rising as viewed in the driving direction.

25. A convertible top according to claim 1, wherein each locking means includes a locking pin secured at a mounting frame means for the fixed-glass windowpane means by way of a holding means and a lower lock part arranged at the body, the locking pin cooperating with a locking catch of the lower lock part.

26. A convertible top according to claim 1, further comprising a sealing member placed on the forward edge of the fixed-glass windowpane means spanning the passenger space bow-shaped, the sealing member abutting under prestress at the top cover section disposed thereabove.

27. A convertible top according to claim 1, wherein the fixed-glass windowpane means includes electric heating wires.

* * * * *